United States Patent [19]
Holz

[11] Patent Number: 5,664,397
[45] Date of Patent: Sep. 9, 1997

[54] SANDWICH PLATE FOR USE AS MOTOR-VEHICLE BODY PART

[75] Inventor: Rüdiger Holz, Wörthsee, Germany

[73] Assignee: Krauss-Maffei Verkehrstechnik GmbH, Munich, Germany

[21] Appl. No.: 606,489

[22] Filed: Mar. 4, 1996

[30] Foreign Application Priority Data

Mar. 18, 1995 [DE] Germany ............. 195 09 972.9

[51] Int. Cl.⁶ ........................................... E04C 2/34
[52] U.S. Cl. ............. 52/794.1; 52/309.9; 52/793.1; 52/144; 52/145; 296/191; 296/901; 181/294
[58] Field of Search .................. 52/309.8, 309.9, 52/783.1, 793.1, 794.1, 795.1, 505, 323, 787.11, 787.12, 145, 144, 309.14, 309.16, 309.7, 784.11, 784.15; 296/191, 901, 900; 181/294, 288, 284

[56] References Cited

U.S. PATENT DOCUMENTS

| | | | |
|---|---|---|---|
| 2,117,397 | 6/1938 | Bonsall | 52/794.1 |
| 2,728,702 | 12/1955 | Simon et al. | 52/309.9 X |
| 2,960,196 | 11/1960 | Meserole | 52/794.1 |
| 3,028,278 | 4/1962 | Gronemeyer | 52/793.1 X |
| 3,232,017 | 2/1966 | Prusinski et al. | 52/794.1 X |
| 3,239,982 | 3/1966 | Nicosia | 52/309.8 X |
| 3,412,513 | 11/1968 | Gosele | 52/144 X |
| 3,608,264 | 9/1971 | Jones et al. | 52/144 X |
| 3,626,044 | 12/1971 | Arnaud | 52/309.7 X |
| 3,791,912 | 2/1974 | Allard | 52/309.9 X |
| 3,903,663 | 9/1975 | Bainter | |
| 4,369,608 | 1/1983 | Miura et al. | 52/309.9 |
| 4,513,041 | 4/1985 | Delluc | 181/294 X |
| 4,555,134 | 11/1985 | Gruna | |
| 5,258,585 | 11/1993 | Juriga | 181/294 X |

FOREIGN PATENT DOCUMENTS

| | | | |
|---|---|---|---|
| 2376925 | 9/1978 | France | 52/309.9 |
| 763 356 | 6/1953 | Germany . | |
| 904461 | 2/1954 | Germany | 52/145 |
| 70 794 | 1/1970 | Germany . | |
| 31 16 938 | 11/1982 | Germany . | |
| 86 24 313 | 12/1986 | Germany . | |
| 35 46 050 | 7/1987 | Germany . | |
| 39 27 538 | 2/1991 | Germany . | |
| 39 32 121 | 4/1991 | Germany . | |
| 91 05 019 | 8/1991 | Germany . | |
| 41 07 285 | 9/1992 | Germany . | |
| 93 19 082 | 3/1994 | Germany . | |
| 484114 | 12/1975 | U.S.S.R. | 296/191 |
| 754299 | 8/1956 | United Kingdom | 52/309.8 |

*Primary Examiner*—Carl D. Friedman
*Assistant Examiner*—Aimee E. McTigue
*Attorney, Agent, or Firm*—Herbert Dubno

[57] ABSTRACT

A sandwich plate has a pair of relatively dense, stiff, thin, and generally parallel longitudinally extending skins, and a less dense core body having a pair of generally parallel faces bonded to the skins and formed with longitudinal and transverse cavities connected together in a Z-shape and forming central longitudinally extending tongues.

11 Claims, 4 Drawing Sheets

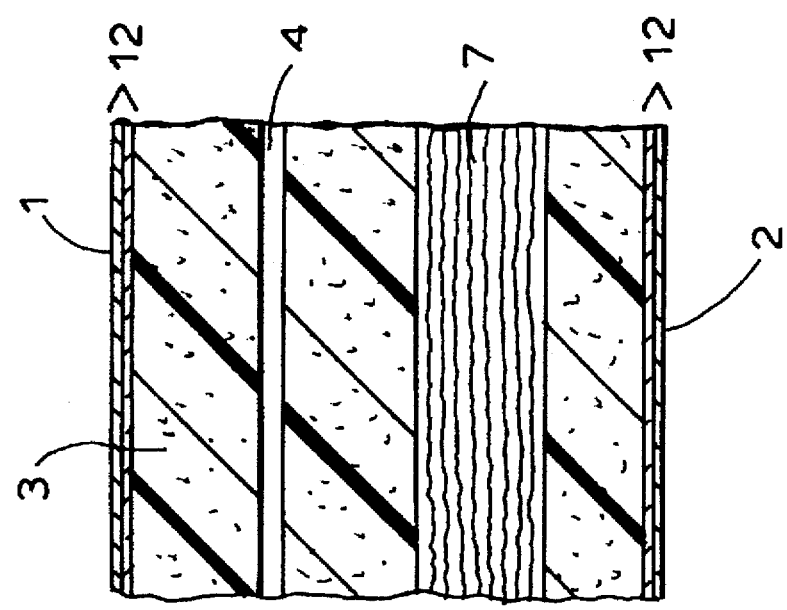
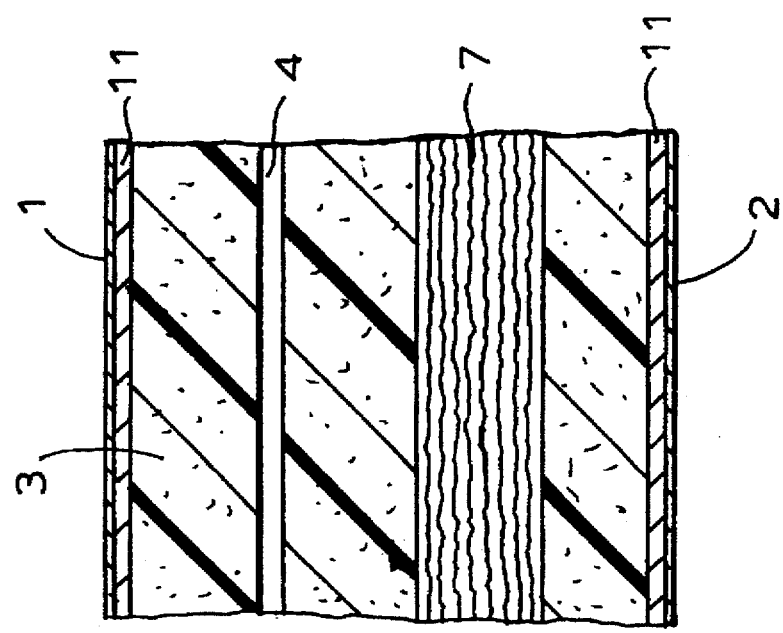

SANDWICH PLATE FOR USE AS MOTOR-VEHICLE BODY PART

FIELD OF THE INVENTION

The present invention relates to a sandwich plate. More particularly this invention concerns such a plate which is specifically intended for use in making a motor-vehicle body panel or part.

BACKGROUND OF THE INVENTION

A standard sandwich plate such as described in U.S. Pat. No. 3,903,663 (Bainter et al) and U.S. Pat. No. 4,555,134 (Gruna), German utility models 86 24 313, 91 05 019, or 93,19 082 or German patent documents 763,356 (Wagenseil), 3,116,938 (Lukoschek et al), 3,546,0950 (Vogt et al), 3,927,538 (Spormann), and 4,107,285 (Schmidt) has a pair of relatively hard outer skins bonded to a somewhat softer core body. The outer skins can be a hard dense synthetic resin or metal while the core can be an open- or closed-cell foam resin or a honeycomb. The plate must have a certain physical strength and must also damp sound. For the latter purpose it is standard to provide a sound-absorbing layer between one or both of the skins and the core, to provide a sound-absorbing filler between rib of the plate, or to mount the inner skin so as to minimize transmission of vibration to it from the core.

When such a plate is used in the construction of light vehicles where it must carry a load it is standard to use several of them. This is the case in, for example, magnetic-drive or cooled/refrigerated systems.

Normally the thin skins carry the longitudinally effective loads, that is loads parallel to the surfaces of the plate. The core maintains the spacing between the skins, prevents the skins from bulging, and shear in the core is effective to carry transverse loads.

In order to reduce sound transmission through such a sandwich plate it is standard to use additional sound-absorbing layers which add considerably to the construction cost of the plate. In order to suppress low-frequency sounds it is necessary to limit the transmission of vibration longitudinally in the plate. Double-wall sandwich plates transmit sound well because the skins are solidly connected to the core in the transverse direction. The connection is the result of the module of elasticity of the core and the stiffness of the air cushion captured between the skins.

OBJECTS OF THE INVENTION

It is therefore an object of the present invention to provide an improved sandwich plate.

Another object is the provision of such an improved sandwich plate which overcomes the above-given disadvantages, that is which effectively damps sound but that is relatively strong and cheap to manufacture.

SUMMARY OF THE INVENTION

A sandwich plate has according to the invention a pair of relatively dense, stiff, thin, and generally parallel longitudinally extending skins, and a less dense core body having a pair of generally parallel faces bonded to the skins and formed with longitudinal and transverse cavities connected together in a Z-shape and forming central longitudinally extending tongues.

The construction according to the invention is effectively as good as a double-wall structure with respect to sound attenuation, but has the physical strength of a single-wall structure. In the transverse direction, that is generally perpendicular to the outer faces of the plate, the plate is relatively soft and elastically deformable, but longitudinally, that is generally parallel to the outer faces of the plate, it is very strong.

According to the invention the core is formed by a plurality of sections each having two of the longitudinal cavities and one of the transverse cavities. This construction makes it particularly easy to form the cavities, with the one cavity opening longitudinally in one direction from the respective section, the other cavity in the opposite direction, and the transverse cavity extending along one of the end faces. Thus each Z-shape will be formed by one longitudinal cavity from one section and its associated transverse cavity and a transverse cavity from the adjacent section.

In order to suppress low-frequency sounds best the longitudinal cavities are of different thicknesses with one of the longitudinal cavities of each section thicker than the other longitudinal cavity. In addition the thicker longitudinal cavity of each section is provided with a compressible mass of sound-absorbing material, e.g. glass wool. Furthermore the other thinner longitudinal cavity of each section has a transversely directed inclined end surface and the thickness of the cavities and the material of the core are such that optimal damping of the plate is achieved in its resonant frequency.

According to the invention the core is thicker in each section between one of the longitudinal cavities and the respective skin than between the other of the longitudinal cavities and the respective skin. One of the cavities has an angled generally longitudinally facing end surface.

To further increase the sound-attenuating effectiveness of the plate it has a sound-absorbing layer between one of the skins and the core. Alternately at least one of the skins includes a pair of stiff and thin layers and an intermediate layer of viscoelastic sound-absorbing material between the thin layers.

In order to make the plate curved the core is formed with a plurality of slits open at one of the faces and extending partially through the tongues. One of the skins, normally the outside skin in a curved plate is reinforced with fibers.

BRIEF DESCRIPTION OF THE DRAWING

The above and other objects, features, and advantages will become more readily apparent from the following description, reference being made to the accompanying drawing in which:

FIGS. 3 and 4 are sections through further plates in accordance with this invention.

SPECIFIC DESCRIPTION

Figure 1:
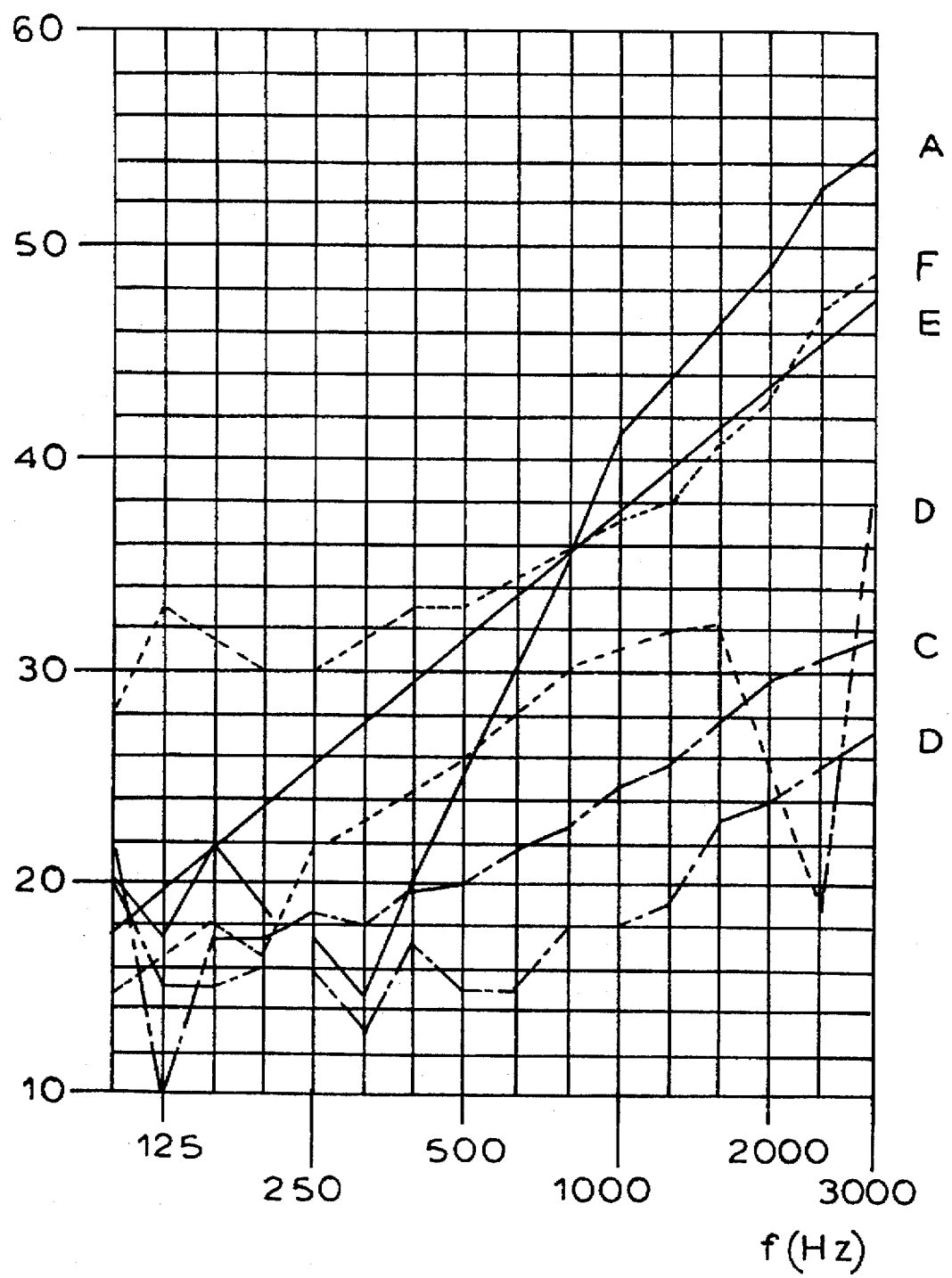
FIG. 1 is a graph illustrating the sound-transmitting performance of sandwich panels according to the invention and of the prior art.

FIG. 1 shows curves A through F for six different plates or panels, with sound transmission Rw in decibels plotted against frequency f in Hertz. Curve F represents a solid wall having a mass of 10 kg/m². Curves B, C, and D are for various standard prior-art sandwich plates and all lie below the curve F. Each curve B, C, and D has at least one location where sound is transmitted particularly well. Curve B represents a plate with a hard polyurethane core and is a good sound insulator in the 250 Hz to 1600 Hz range but conducts sound in the 2500 Hz region particularly well. Curve E represents a plate that has an aluminum honeycomb core and a sound-absorbing layer so it is therefore very rigid and in the upper frequency regions is nearly as good as the ideal shown by curve F. Curve B represents a plate with two skins solidly bonded to a core body and that at about 125 Hz is an excellent conductor of sound.

Figure 2:
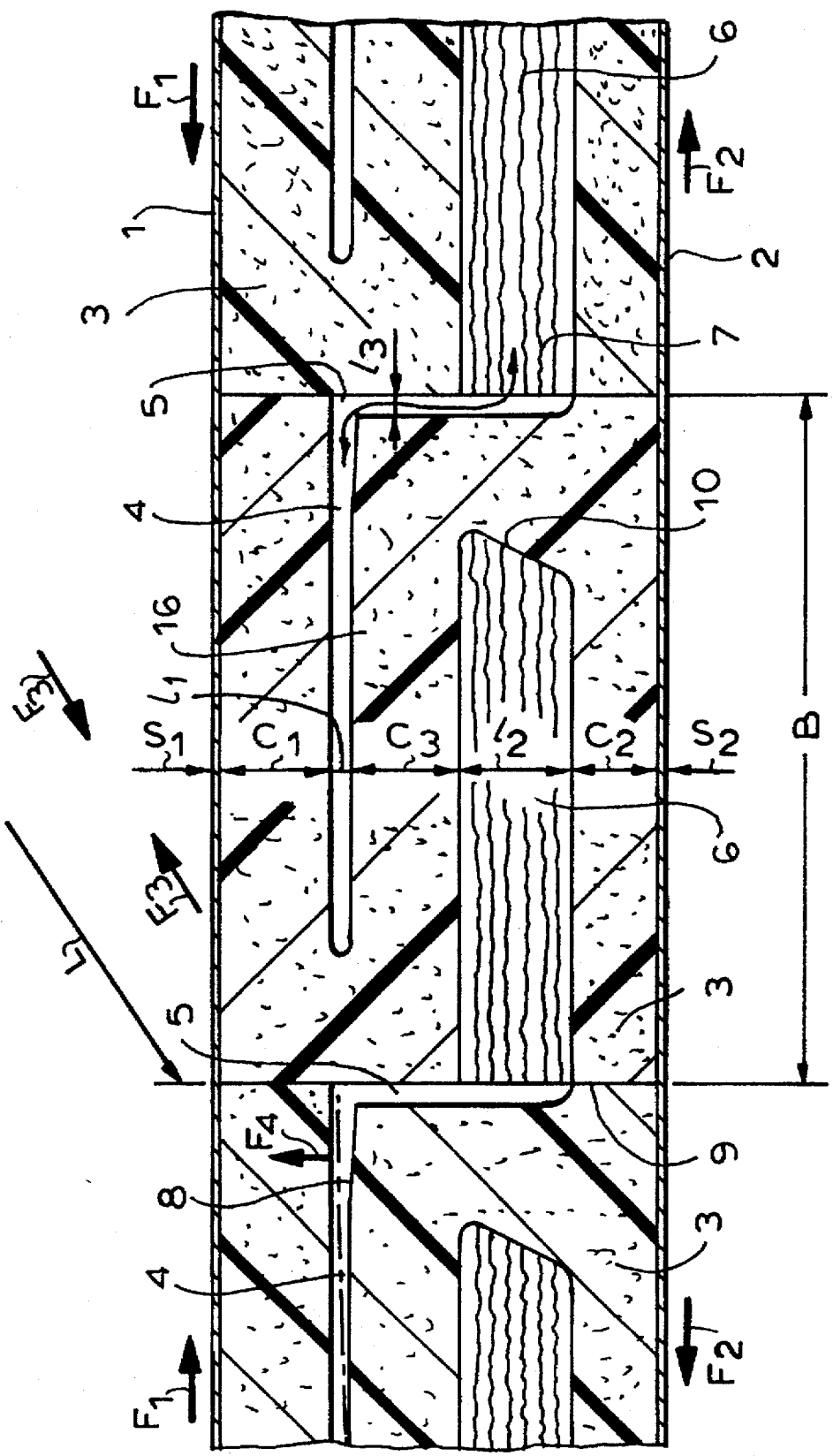
FIG. 2 is a cross section through a sandwich plate according to the invention.

According to the invention as shown in FIG. 2 a sandwich plate has skins 1 and 2 sandwiching a foam-resin core 3. The plate 1, 2, 3 is made relatively compressible transversely but longitudinally very stiff and strong. This effect is achieved by forming the core with cavities 4, 5, and 6 with the cavities 4 and 5 extending longitudinally and parallel to the surfaces of the plate and the cavity 5 extending between the respective cavities 4 and 5 and forming therewith a Z-shape. Tongues 16 of core material extend longitudinally between the cavities 4 and 6. Presuming that the cavities 4 and 6 are of the same thickness, about 7 mm, the result is the response curve shown at A in FIG. 1.

In the inventive arrangement the resonant frequency is about 320 Hz where only 15 dB damping is achieved. Even at this level the damping is about 3 dB better than the best of the standard sandwich plates shown at curves B, C, and D. At higher frequencies above 1000 Hz there is a full effect as good as a double-wall construction and in fact the solid-wall curve F is overshot by some 5 dB, that of the conventional plates of curves B, C, and D by some 20 db, and even that of the curve E by some 6 dB.

The load-bearing capacity of the sandwich plate formed with the core cavities 4 through 6 is maintained by using a core material of considerable density and rigidity. The flow of force in the core 3 of a flat bent panel is effective as a compression or tension of the tongues 16 for forces parallel to the faces of the plate and as shear when transverse thereto. The cover layer 2 which is subjected to tension $F_2$ does not need to be protected against buckling so that the material of the core 3 can have a relatively small thickness $C_2$ between the layer 2 and the cavity 6. On the other hand the layer 1 which is subject to compression $F_1$ can buckle so it must be supported and in this region the core 3 has a somewhat greater thickness $C_1$ between this skin 1 and the cavity 4. A force $F_3$ parallel to the skins 1 and 2 and perpendicular to the compression $F_1$ is effective on the thickness $C_1$ plus the thickness $L_1$ of the cavity 4 and the thickness $C_3$ of the core 3 between the cavities 4 and 6.

For best force transmission the end surfaces 10 of the cavities 6 extend at an acute angle to a plane perpendicular to the flanking skins 1 and 2. In addition the core 3 is subdivided into a plurality of sections of width B. Making these sections of trapezoidal section, that is with end surfaces 9 that are not perpendicular to their faces that are adhered to the skins 1 and 2 allows a nonplanar plate to be made relatively easily. Adjacent end faces of the cores 3 are glued together at the surfaces 9. When highly loaded perpendicular to its plane by pressure the cavity 4 is completely closed and bears on an inclined transversely directed face 8 so that a force $F_4$ can be handled. If there were no bevel or inclined face 8, when the structure was bent the force $F_4$ would be applied along a line and would damage the plate.

A disadvantage of this system is its resonant frequency and relatively good sound transmission around 320 dB. This can be reduced by increasing the thickness or heights $L_1$ and $L_2$ of the cavities 4 and 6, in particular by setting them at different thicknesses with the thicknesses $L_1$ and $L_2$ forming a ratio of about 1:5. The transverse passage 5 has a width $L_3$ equal roughly to thickness $L_1$. In addition the larger cavity is filled with a mass 7 of sound-absorbing material, here glass wool. Thus on transverse compression of the plate the air is pumped through the cavity 5 between the cavities 4 and 6, being braked as it moves through the nonstraight path and into and out of the mass 7.

To maximize sound damping of lower frequencies, for instance motor noises, FIG. 3 shows an arrangement where a soft sound-deadening layer 11 formed by a thick mastic is provided under each skin 1 and 2, although it could also be provided outside the skin 1 or 2, for instance on the inside of the plate. Alternately as shown in FIG. 4 a laminated plate 12 with an intermediate layer of a viscoelastic sound-deadening material can act as the skin 1 and/or 2.

Figure 5:
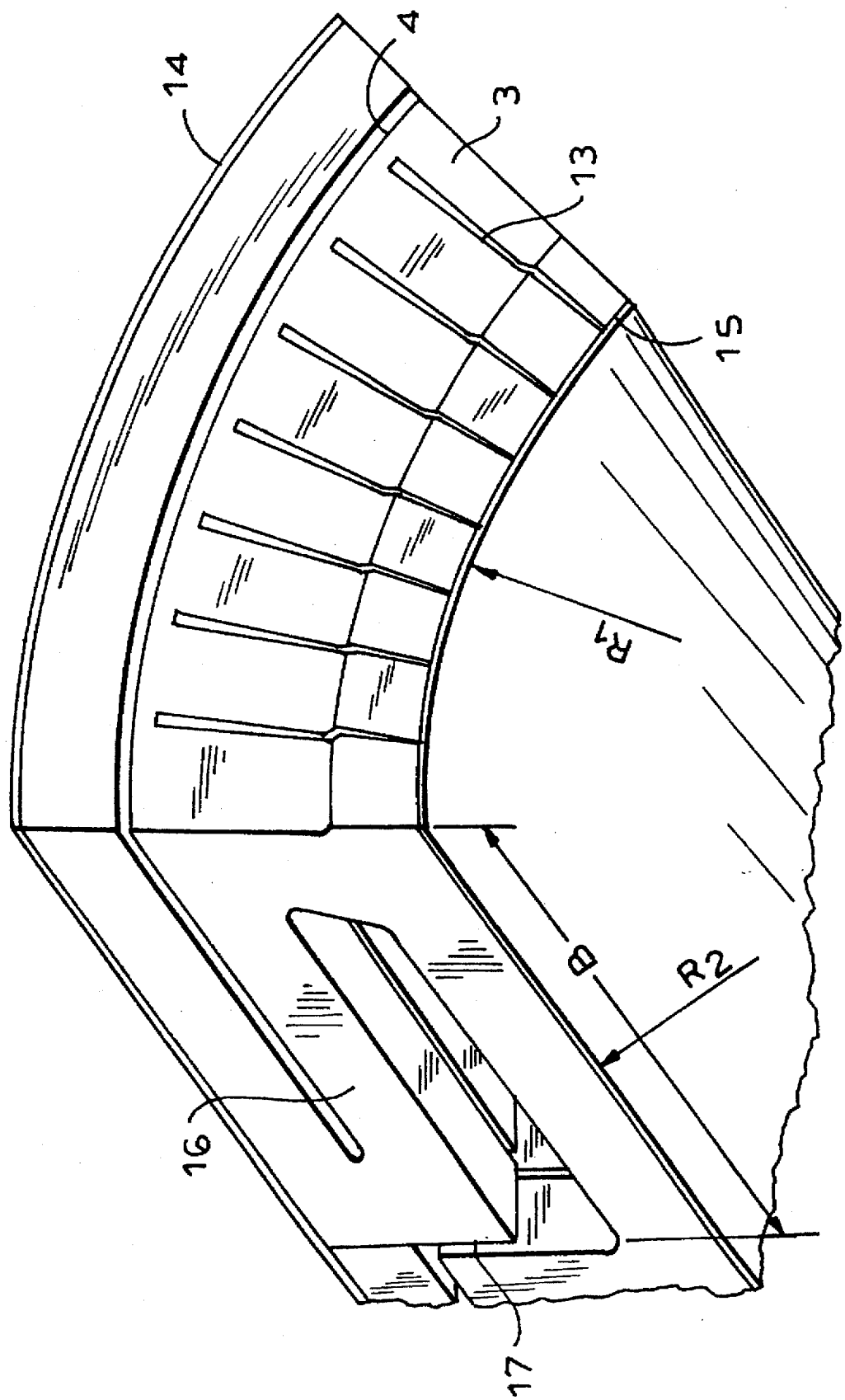
FIG. 5 is a perspective view of another plate according to the invention.

FIG. 5 shows a plate formed with slots 13 that open to one side and that extend part of the way through the tongues 16. This plate has an outside skin 14 and an inside skin 15 and the slots 13 allow the plate to be bent around a relatively small radius R1. Transverse thereto the plate can have a larger radius R2 created by beveling the ends 17 of the sections of length B as described above.

The cover skins for curved sandwich plates can be formed manually or by deep drawing. Normally a fiber-reinforced skin 14 is put in a negative die that has the desired shape and then the core element 3 is pressed into place and hardened. Then the cover skin 15 is directly laminated on the core 3.

I claim:

1. A sandwich plate comprising:
   a pair of relatively dense, stiff, thin, and generally parallel longitudinally extending skins; and
   a less dense core body having a pair of generally parallel faces bonded to the skins and formed with a plurality of pairs of longitudinally extending and longitudinally overlapping cavities and with respective transversely extending cavities each connected in a Z-shape between a respective two of the longitudinal cavities, the longitudinal and transverse cavities forming central longitudinally extending tongues each flanked by two of the longitudinal cavities and ending at a respective one of the transverse cavities.

2. The sandwich plate defined in claim 1 wherein the core is formed by a plurality of sections each having two of the longitudinal cavities and one of the transverse cavities.

3. The sandwich plate defined in claim 2 wherein the longitudinal cavities are of different thicknesses with one of the longitudinal cavities of each section thicker than the other longitudinal cavity.

4. The sandwich plate defined in claim 3 wherein the thicker longitudinal cavity of each section is provided with a compressible mass of sound-absorbing material.

5. The sandwich plate defined in claim 3 wherein the other thinner longitudinal cavity of each section has a transversely directed inclined end surface.

6. The sandwich plate defined in claim 3 wherein the core is thicker in each section between one of the longitudinal cavities and the respective skin than between the other of the longitudinal cavities and the respective skin.

7. The sandwich plate defined in claim 3 wherein one of the cavities has an angled generally longitudinally facing end surface.

8. The sandwich plate defined in claim 1, further comprising a sound-absorbing layer between one of the skins and the core.

9. The sandwich plate defined in claim 1 wherein at least one of the skins includes a pair of stiff and thin layers and an intermediate layer of viscoelastic sound-absorbing material between the thin layers.

10. The sandwich plate defined in claim 1 wherein the core is formed with a plurality of slits open at one of the faces and extending partially through the tongues.

11. The sandwich plate defined in claim 1 wherein one of the skins is reinforced with fibers.

* * * * *